June 24, 1941.  J. D. AVERILL  2,247,009
SAFETY AXLE SNUBBER
Filed July 19, 1940
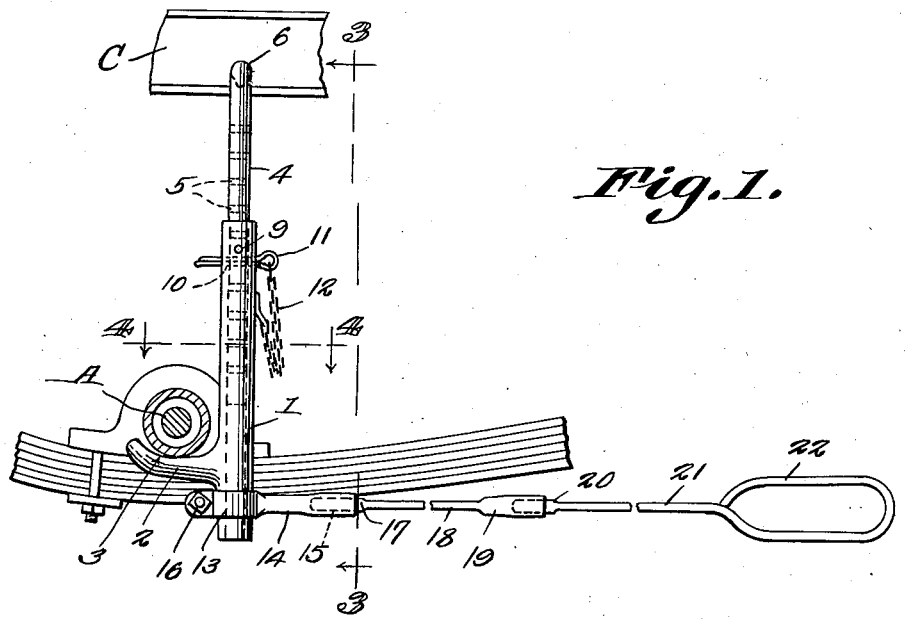
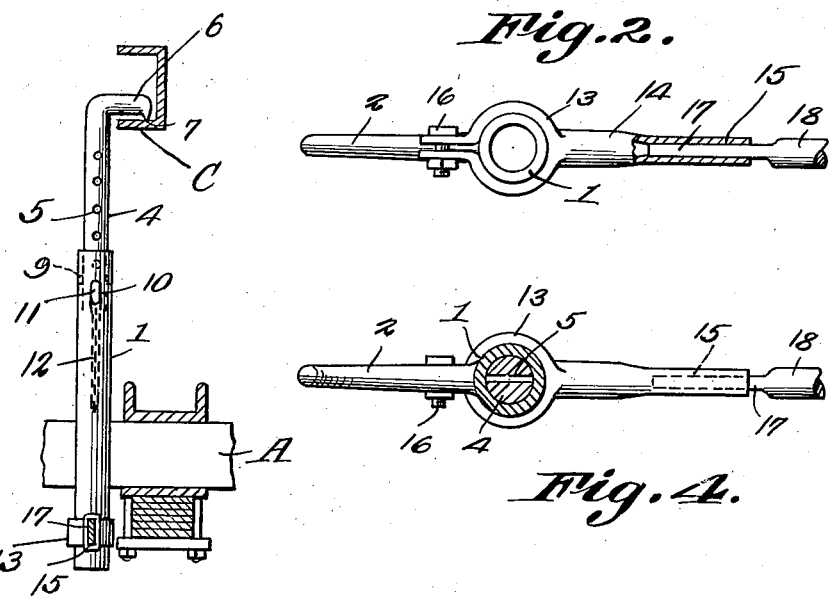
Jesse D. Averill
INVENTOR.
BY
ATTORNEYS.

Patented June 24, 1941

2,247,009

UNITED STATES PATENT OFFICE 2,247,009

SAFETY AXLE SNUBBER

Jesse D. Averill, Ajo, Ariz.

Application July 19, 1940, Serial No. 346,423

4 Claims. (Cl. 254—133)

This invention relates to an axle snubber designed for use on motor vehicles while being lifted with a bumper jack.

An object of the invention is to provide a device of this character which can be readily inserted into position for engagement both with the axle and the chassis frame whereby, when the vehicle is lifted by means of a jack placed under the bumper, the axle will be lifted with the frame without placing any strain upon the springs.

A further object is to provide a snubber with a simple means by which it can be easily inserted under the vehicle and placed in position, the snubber being adjustable for engagement with either side of the frame or with either end and being also adjustable in length to meet the requirements.

A still further object is to provide a device of this character which is simple in construction, easy to manipulate, and can be stored readily with the usual tool kit.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of the device, the same being shown in engagement with an axle and the frame of a vehicle, portions of the handle rod being broken away.

Figure 2 is a bottom plan view of the tool, a portion of the handle rod being broken away.

Figure 3 is a section on line 3—3, Figure 1.

Figure 4 is a section on line 4—4, Figure 1.

Referring to the figures by characters of reference, I designates the lower tubular member of the tool provided, adjacent to its lower end, with a projecting arm 2 of any suitable shape. In the structure illustrated this arm is slightly curved in an upward direction to provide a seat 3. Adjustably mounted within the member I is the upper member 4 in the form of a round rod in which is formed a longitudinal series of openings 5 extending diametrically therethrough. The upper end of this member 4 has a laterally extending arm 6 the free end of which can be downturned, as at 7, so as to provide a seat 8.

The lower member I has diametrical openings 9 and 10 extending therethrough at right angles to each other and either of these openings is adapted to receive a pin 11 which can be connected to member I by means of a chain 12 or the like.

A split sleeve 13 is clamped about the member I near its lower end and has an arm 14 extending therefrom provided with an angular socket 15. The sleeve is held in clamping position by means of a bolt 16 or the like and the socket 15 in the arm is proportioned to receive the flattened end 17 of one section 18 of a handle rod. This section has a socket member 19 at its other end which, in turn, is proportioned to receive the angular end 20 of another section 21 of the handle rod. Any desired number of these sections can be used but in the structure illustrated two of them have been provided, the section 21 being formed with a looped portion or handle 22 by which the device can be manipulated readily.

Under normal conditions the member 4 is housed within the member I where it can be held by inserting pin 11 through one of the openings 9 and 10 and one of the openings 5. The sections of the handle rod are separated and thus the entire device can be stored compactly in a tool kit or at any other convenient point.

When it is desired to jack up the vehicle by means of a bumper jack, the tool is adjusted so that arms 2 and 6 will be positioned where arm 6 can be placed over a part of the chassis frame C while arm 2 is extended under the axle A. Sleeve 13 is also adjusted on member I and tightened with arm 14 extending in the direction from which the tool can be handled most conveniently. The sections of the handle rod are then assembled with each other and with arm 14 and by means of this rod the tool is inserted under the vehicle and point 7 placed on or in chassis C while arm 2 is thus suspended under and close to the axle A. The bumper jack is then used for lifting the vehicle and as soon as the bumper and chassis begin to rise, the axle 2 will be lifted therewith so that no strain is thus placed on the springs and it is not necessary to lift the chassis a great distance simply for the purpose of removing the wheel from contact with the ground.

By assembling the members I and 4 as described, member 4 can be adjusted both longitudinally and angularly relative to member I. Thus the tool can be placed on either side of the vehicle or in engagement with any other convenient part of the chassis in order to bring arm 2 in position where it can extend under the axle.

Obviously under some conditions the arm 2 can be placed under the spring instead of under the axle.

A device of this type eliminates the necessity of lifting the car a considerable distance in order to remove the tire from contact with the ground. Where a high lift has been necessary it has been found that a slight push has frequently caused the jack to slip and the car to roll or slide out of position, thereby causing delay and possible injury. These objectionable features are eliminated in the present case and the snubber is safe to use under all conditions.

What is claimed is:

1. An axle snubber including telescopically connected upper and lower members, an axle-engaging arm extending from the lower member, a chassis engaging arm extending from the upper member, both of said arms providing seats for engaging under the axle and over the chassis respectively, said upper member being adjustable longitudinally and angularly relative to the lower member, means insertible through the members for holding them against relative movement after adjustment, a socket member extending from the lower member, and a handle rod removably engaging the socket member.

2. An axle snubber including telescopically connected upper and lower members, an axle-engaging arm extending from the lower member, a chassis engaging arm extending from the upper member, both of said arms providing seats for engaging under the axle and over the chassis respectively, said upper member being adjustable longitudinally and angularly relative to the lower member, means insertible through the members for holding them against relative movement after adjustment, a socket member detachably and adjustably connected to the lower member, and a sectional handle rod detachably engaging the socket member.

3. An axle snubber including telescopically connected upper and lower members, an arm extending from the lower member for engagement with a part to be raised, a chassis-engaging arm extending from the upper member, both of said arms providing seats for respectively engaging under the part to be raised over a portion of the chassis, said upper member being adjustable longitudinally and angularly relative to the lower member to change the distance between the arms and the directions in which they are extended relative to each other, means engaging the members for holding them against relative movement after adjustment, and an elongated rigid device connected to one of the members for supporting the snubber while being inserted by hand under a chassis and into engagement with the chassis and a part to be supported therefrom.

4. An axle snubber including telescopically connected upper and lower members, an arm extending from the lower member positioned for engagement with a part to be lifted, a chassis-engaging arm extending from the upper member, both of said arms providing seats for engaging under said part and over a portion of the chassis respectively, said upper member being adjustable longitudinally and angularly relative to the lower member, means engaging the members for holding them against relative movement after adjustment, a member detachably and adjustably connected to the lower member, a handle rod, and means for detachably connecting said rod to said detachable and adjustable member.

JESSE D. AVERILL.